US008018449B2

(12) United States Patent
Jeon

(10) Patent No.: US 8,018,449 B2
(45) Date of Patent: Sep. 13, 2011

(54) LIGHT EMITTING DISPLAY CAPABLE OF CONTROLLING BRIGHTNESS

(75) Inventor: Chang Hoon Jeon, Chilgok-gun (KR)

(73) Assignee: LG Display Co., Ltd., Seoul (KR)

( * ) Notice: Subject to any disclaimer, the term of this patent is extended or adjusted under 35 U.S.C. 154(b) by 860 days.

(21) Appl. No.: 11/454,597

(22) Filed: Jun. 16, 2006

(65) Prior Publication Data

US 2007/0035498 A1 Feb. 15, 2007

(30) Foreign Application Priority Data

Aug. 11, 2005 (KR) ........................ 10-2005-0073872

(51) Int. Cl.
*G06F 3/038* (2006.01)
(52) U.S. Cl. ........................................................ 345/207
(58) Field of Classification Search ........................ None
See application file for complete search history.

(56) References Cited

U.S. PATENT DOCUMENTS 5,473,373 A * 12/1995 Hwung et al. ................ 348/254
2002/0126106 A1* 9/2002 Naito ............................ 345/204
2003/0170491 A1* 9/2003 Liao et al. ...................... 428/690
2003/0201727 A1* 10/2003 Yamazaki et al. ......... 315/169.1
2004/0070558 A1* 4/2004 Cok et al. ........................ 345/76
2004/0201556 A1* 10/2004 Oomori et al. .................. 345/76
2004/0257355 A1* 12/2004 Naugler ........................ 345/204

FOREIGN PATENT DOCUMENTS

CN 1448902 10/2003
CN 1595486 3/2005

OTHER PUBLICATIONS

First Office Action issued in corresponding Chinese Patent Application No. 2006100870452.2; issued Mar. 7, 2008.

* cited by examiner

*Primary Examiner* — Alexander Eisen
*Assistant Examiner* — Matthew Yeung
(74) *Attorney, Agent, or Firm* — Brinks Hofer Gilson & Lione

(57) ABSTRACT

The light emitting display further comprises a scan driver that supplies a first scan signal, which is a write signal that selects the data signal and a second scan signal, which is an erasing signal to the pixels, and a timing controller that supplies data, which divide one frame into a plurality of sub-fields and adjust the data signal corresponding to each of the plurality of sub-fields depending on brightness of the pixel circuit, to the data driver.

11 Claims, 4 Drawing Sheets

LIGHT EMITTING DISPLAY CAPABLE OF CONTROLLING BRIGHTNESS

The present application claims the benefit of Korean Patent Application No. 10-2005-0073872 filed in Korea on Aug. 11, 2005, which is hereby incorporated by reference.

FIELD

The present invention relates to a light emitting display.

RELATED ART

Recently, various flat display, which can reduce large weight and bulk which are a drawback of a cathode-ray tube, has been developed. The flat display comprises a liquid crystal display, a field emission display, a plasma display panel, a light emitting display and so on.

The light emitting display is a self-emitting element for emitting a phosphorous material by recombining an electron and a hole, and is roughly classified into an inorganic light emitting display and an organic light emitting display depending on a material and a structure. The light emitting display has a fast response speed as in a cathode-ray tube, compared to a passive light emitting device that requirs a separate light source as in a liquid crystal display.

FIG. 1 is a conventional organic light emitting cell of a general pixel circuit.

The organic light emitting display comprises an electron injecting layer 4, an electron transporting layer 6, a light emitting layer 8, a hole transporting layer 10, and a hole injecting layer 12 which are stacked between a cathode electrode 2 and an anode electrode 14.

When a voltage is applied between the positive electrode 14, which is a transparent electrode and the cathode electrode 2, which is a metal electrode, an electron generated from the cathode electrode 2 moves toward the light emitting layer 8 through the electron injecting layer 4 and the electron transporting layer 6. Furthermore, a hole generated from the anode electrode 14 moves toward the light emitting layer 8 through the hole injecting layer 12 and the hole transporting layer 10. Accordingly, in the light emitting layer 8, as an electron and a hole, which are supplied from the electron transporting layer 6 and the hole transporting layer 10, are collided and recombined, light is generated. The light emits to the outside through the anode electrode 14 that is a transparent electrode, so that an image is displayed.

The general light emitting display uses a surface area division driving method and a time division driving method in order to represent gray level.

The surface area division driving method divides one pixel into a plurality of sub-pixels and represents gray level by independently dividing each of the plurality of sub-pixels depending on a digital data signal. However, there is a problem that the surface area division driving method has a complex pixel structure.

On the other hand, the time division driving method represents gray level by controlling a light emitting time of a pixel. That is, gray level is represented by dividing one frame into a plurality of sub-fields. The time division driving method divides a pixel into a light emitting time and a non-light emitting time depending on a digital data signal during a period of each sub-field and represents gray level of a pixel by combining light emitting times of each pixel within one frame period.

In general, the light emitting display uses a time division driving method because it has a faster response speed than a liquid crystal display.

FIG. 2 is a diagram illustrating the timing of data by a time division driving method of a general light emitting display.

Referring to FIG. 2, a driving method of the light emitting display that uses a general time division driving method divides each frame into a plurality of sub-fields (SF1 to SF12) corresponding to each bit of a digital data signal in order to represent gray level of a digital data signal. At this time, in FIG. 2, a 12-bit digital data signal is represented with 256-level gray level and one frame is divided into 12 sub-fields (SF1 to SF12) to correspond to the 12-bit digital data signal. A first sub-field (SF1) among the 12 sub-fields (SF1 to SF12) corresponds to the lowest bit of the digital data signal and a twelfth sub-field (SF12) corresponds to the highest bit of the digital data signal.

Each of the 12 sub-fields (SF1 to SF12) is divided into light emitting times (LT1 to LT12) and non-light emitting times (UT1 to UT12). The light emitting times (LT1 to LT12) of each of sub-fields (SF1 to SF12) can use a binary code consisting of 1:2:4:8:16:32 . . . and a non-binary code consisting of 1:2:4:6:10:14:19 . . . for representing the 12-bit digital data signal with 256-level gray level.

During each period of the sub-fields (SF1 to SF12), the light emitting display emits light by sequentially scanning all pixels in a vertical direction, for example, from an upper direction to a lower direction of the light emitting display panel. Accordingly, light emitting times (LT1 to LT12) of each period of the sub-fields (SF1 to SF12) follow slash marks as shown in FIG. 2 within each of the sub-fields (SF1 to SF12). Desired gray level can be represented by combining all light emitting times (LT1 to LT12) within each of the sub-fields (SF1 to SF12) during one frame.

However, in a conventional light emitting display, there is a problem that brightness is deteriorated due to deterioration of a driving thin film transistor and deterioration of the electron injecting layer 4, the electron transporting layer 6, the hole transporting layer 10, the hole injecting layer 12 and the light emitting layer 8.

FIG. 3 is a view illustrating a configuration of supply voltage sources of the general light emitting display.

Referring to FIG. 3, the conventional light emitting display uses different power voltages ($VDD_R$, $VDD_G$, and $VDD_B$) in R, G, and B pixels, respectively due to the difference in light emitting characteristics of the light emitting layer 8. Therefore, because the conventional light emitting display should separate R, G, and B power sources, it requires an additional power source. Therefore, there is a problem that cost of a panel and the number of parts increase.

SUMMARY

A light emitting display comprises a pixel circuit. The pixel circuit comprises pixels that emit light by a current. The light emitting display further comprises a data driver that supplies a data signal corresponding to the current to the pixels, a scan driver that supplies a first scan signal, which is a write signal that selects the data signal and a second scan signal, which is an erasing signal to the pixels, and a timing controller that supplies data, which divide one frame into a plurality of sub-fields and adjust the data signal corresponding to each of the plurality of sub-fields depending on brightness of the pixel circuit, to the data driver.

BRIEF DESCRIPTION OF THE DRAWINGS

The invention will be described in detail with reference to the following drawings in which like numerals refer to like elements.

DETAILED DESCRIPTION

Preferred embodiments of the present invention will be described in a more detailed manner with reference to the drawings.

Figure 1:
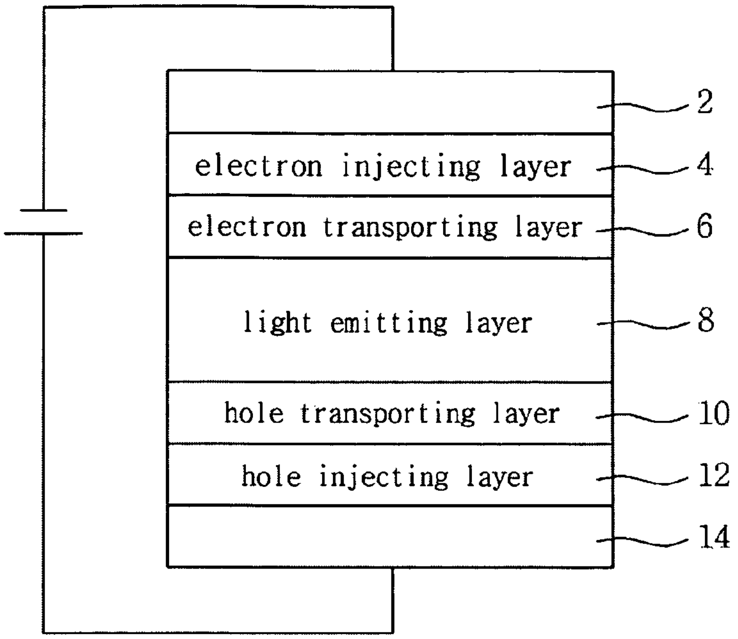
FIG. 1 is a conventional organic light emitting cell of a general pixel circuit.
Figure 2:
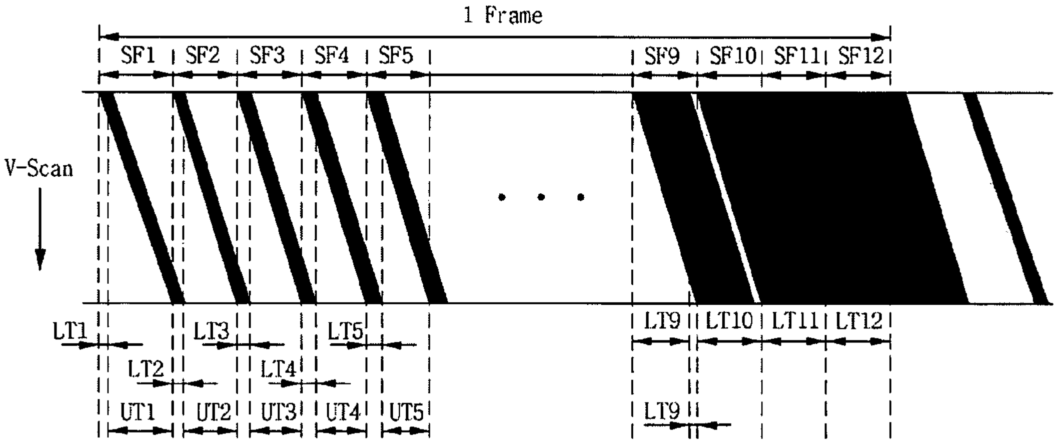
FIG. 2 is a diagram illustrating the timing of data by a time division driving method of a general light emitting display.
Figure 3:
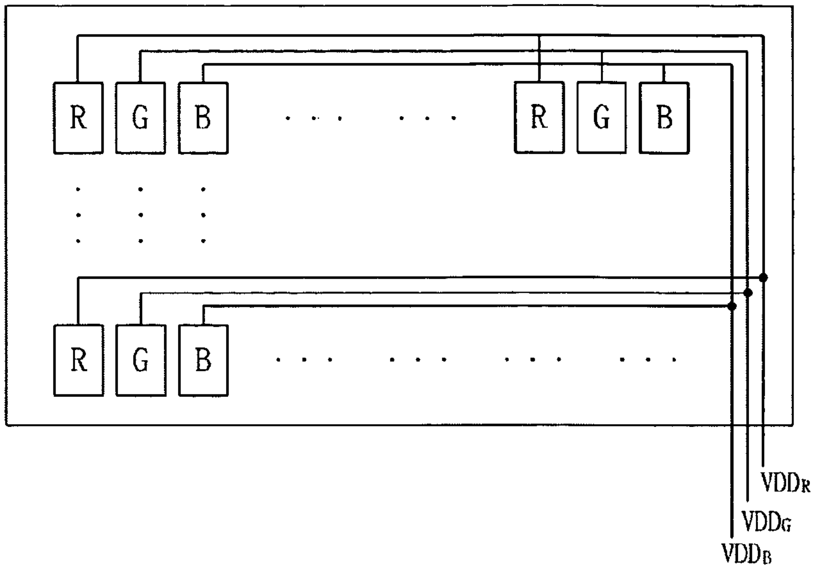
FIG. 3 is a view illustrating a configuration of supply voltage sources of the general light emitting display.
Figure 4:
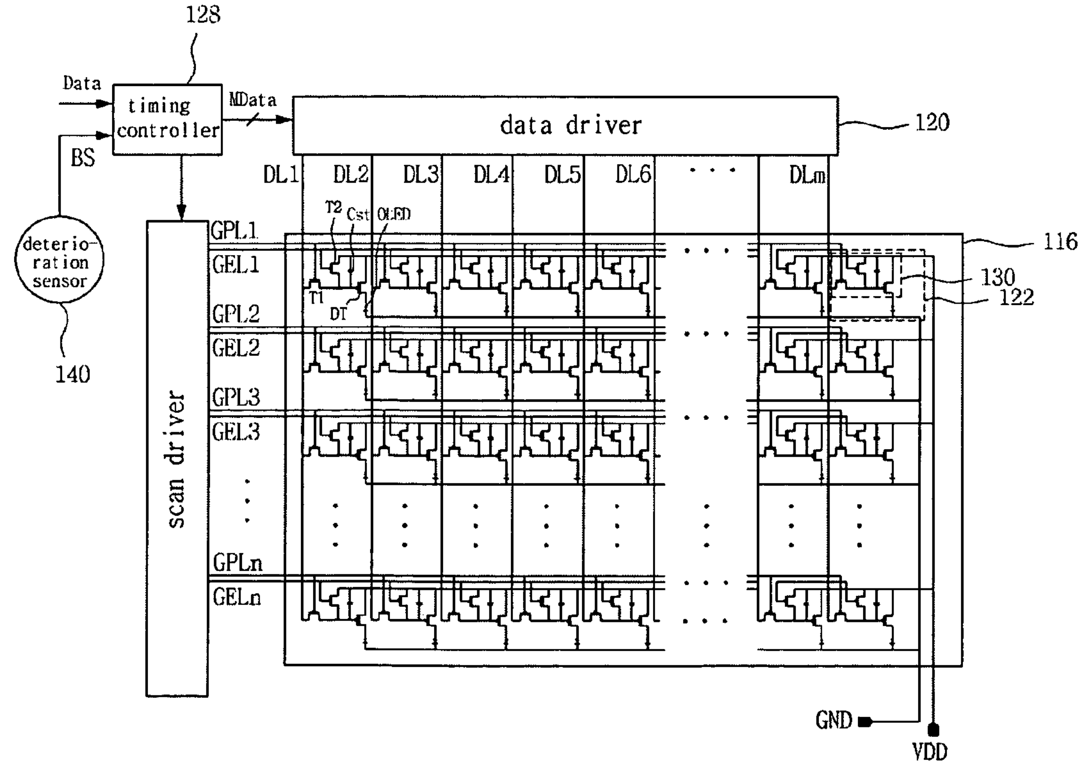
FIG. 4 is a view illustrating a configuration of a light emitting display apparatus according to an embodiment of the present invention.

FIG. 4 is a view illustrating a configuration of a light emitting display apparatus according to an embodiment of the present invention.

Referring to FIG. 4, the light emitting display according to an embodiment of the present invention comprises a pixel circuit 116 comprising pixels 122 that are disposed in every area defined by intersection of first scan lines (GPL1 to GPLn) and second scan lines (GEL1 to GELn) and data lines (DL1 to DLm), a scan driver 118 for driving the first scan lines (GPL1 to GPLn) and the second scan lines (GEL1 to GELn), a data driver 120 for driving the data lines (DL1 to DLm), a deterioration sensor 140 for detecting brightness of the pixel circuit 116, and a timing controller 128 for controlling the driving timing of the scan driver 118 and the data driver 120 and supplying digital data to the data driver 120 depending on a brightness signal (BS) that is supplied from the deterioration sensor 140.

Figure 5:
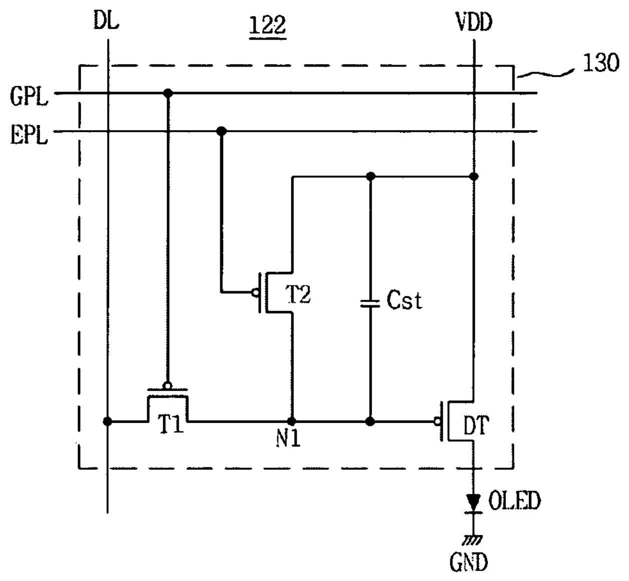
FIG. 5 is an equivalent circuit diagram illustrating the pixel shown in FIG. 4.

FIG. 5 is an equivalent circuit diagram illustrating the pixel shown in FIG. 4.

As shown in FIG. 5, each of the pixels 122 comprises a supply voltage source (VDD), a ground voltage source (GND), a light emitting cell (OLED) which is connected between the supply voltage source (VDD) and the ground voltage source (GND), and a light emitting cell driving circuit 130 for driving a light emitting cell (OLED) depending on a scan signal or a selection signal that are supplied from each of the first scan line (GPL) and the second scan line (EPL).

The light emitting cell comprises, for example, an organic EL or an organic light emitting diode (OLED), but it may comprise an inorganic EL or a light emitting diode (LED).

The light emitting cell driving circuit 130 comprises a driving TFT (Thin Film Transistor) (DT) which is connected between the light emitting cell (OLED) and the supply voltage source (VDD); a first switching TFT (T1) which is connected to the data line (DL), the first scan line (GPL), and the driving TFT (DT); a second switching TFT (T2) connected to a first node (N1) disposed between the first switching TFT (T1) and the driving TFT (DT), the second scan line (GEL), and the supply voltage source (VDD); and a storage capacitor (Cst) which is connected between the first node (N1) and the supply voltage source (VDD).

The TFT is a P-type electron metal-oxide semiconductor field effect transistor (MOSFET) or a P-type MOS transistor.

A gate of the driving TFT (DT) is connected to a drain of the first switching TFT (T1), a source thereof is connected to the supply voltage source (VDD), and a drain thereof is connected to the light emitting cell (OLED).

A gate of the first switching TFT (T1) is connected is to the first scan line (GPL), a source terminal thereof is connected to the data electrode line (DL), and a drain thereof is connected to a gate of the driving TFT (DT).

A gate of the second switching TFT (T2) is connected to the second scan line (GEL), a source thereof is connected to the supply voltage source (VDD), and a drain thereof is connected to the first node (N1).

The storage capacitor (Cst) stores a data voltage of the first node (N1) when the first switching TFT (T1) is turned on and it maintains the on-state of the driving TFT (DT) until a data voltage of a next frame is supplied using the stored data voltage when the first switching TFT (T1) is turned off.

In each of the pixels 122, the driving TFT (DT) is turned on by a data voltage that is input through the data line (DL) by turning on the first switching TFT (T1) when a first scan signal or a gate pulse is input to the first scan lines (GPL1 to GPLn). Accordingly, the light emitting cell (OLED) emits light. After the first switching TFT (T1) is turned off by a first scan signal, which is a write signal that is input to the first scan lines (GPL1 to GPLn), a data voltage that is stored in the storage capacitor (Cst) is discharged by turning on the second switching TFT (T2) when a second signal, which is an erasing signal, is input to the second scan lines (GEL1 to GELn). At this time, the light emitting cell (OLED) emits light until a data voltage that is stored in the storage capacitor (Cst) is discharged.

The deterioration sensor 140 detects a deterioration degree of the pixel circuit 116 and supplies a brightness signal (BS) corresponding to a deterioration degree to the timing controller 128. At this time, the deterioration sensor 140 senses a deterioration degree or brightness of pixels in an outermost line of the pixel circuit 116 for sensing a deterioration degree or brightness without displaying an image to the outside of the panel.

The timing controller 128 generates a data control signal for controlling a data driver 120 and a scan control signal for controlling a scan driver 118 using a synchronous signal that is supplied from an outside system (for example, a graphic card).

Furthermore, the timing controller 128 supplies digital data that are supplied from the outside system to the data driver 120. At this time, the timing controller 128 modulates digital data depending on a brightness signal (BS) that is supplied from the deterioration sensor 140 and supplies the data to the data driver 120.

Figure 6:
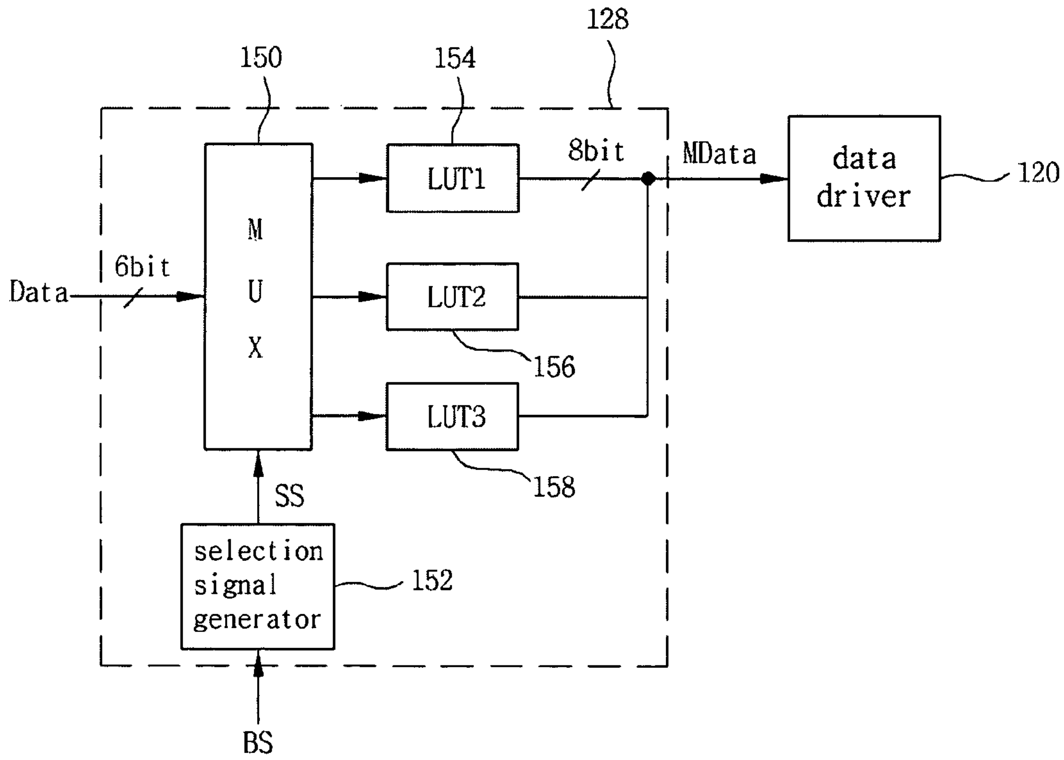
FIG. 6 is a block diagram illustrating a timing controller shown in FIG. 4.

FIG. 6 is a block diagram illustrating a timing controller shown in FIG. 4.

For this reason, as shown in FIG. 6, the timing controller 128 comprises a selection signal generator 152 for generating a selection signal (SS) based on the brightness signal (BS) that is supplied from the deterioration sensor 140, a first to third lookup tables 154, 156, and 158 for converting N-bit digital data that are input from the outside to M-bit (M is a positive integer larger than N) digital data (MData) depending on the selection signal (SS), and a multiplexer 150 for selectively supplying the N-bit digital data which are supplied form the outide to the first and third LUTs 154, 156, and 158 depending on the selection signal (SS) which is supplied from the selection signal generator 152. Here, the N bit is assumed to 6 bit the M bit is assumed to 8 bit.

A selection signal generator 152 supplies a selection signal (SS) of a first logic state to the multiplexer 150 when a brightness signal (BS) that is supplied from the deteroration sensor 140 is a reference value or more, supplies a selection signal (SS) of a second logic state to the multiplexer 150 when the brightness signal (BS) is a middle value, and supplies a selection signal (SS) of a third logic state to the multiplexer 150 when the brightness signal (BS) is a reference value or less.

The selection signal generator 152 generates the selection signal (SS) of a first logic state when a deterioration degree of the pixel circuit 116 is relatively small, generates the selection signal (SS) of a second logic state when a deterioration degree of the pixel circuit 116 is relatively middle, and generates the selection signal (SS) of a third logic state when a deterioration degree of the pixel circuit 116 is relatively large.

The multiplexer 150 supplies 6-bit digital data that are supplied from the outside to the first to the third LUTs 154, 156, and 158 in response to the selection signal (SS) of the first to the third logic state, which is supplied from the selection signal generator 152.

The 6-bit digital data or the LUT input signal (Data) and a panel input signal or 8-bit digital data of the first to third LUTs 154, 156, and 158 depending on a deterioration degree are shown in table 1.

TABLE 1

| 63 gamma(LUT input signal) | First LUT (deterioration degree-low) | Second LUT (deterioration degree-middle) | Third LUT(deterioration degree-high) |
|---|---|---|---|
| 63(111111) | 237(11101101) | 246(11110110) | 255(11111111) |
| 62(111110) | 228(11100100) | 237(11101101) | 246(11110110) |
| 61(111101) | 219(11011011) | 228(11100100) | 237(11101101) |
| 60(111100) | 210(11010010) | 219(11011011) | 228(11100100) |
| 59(111011) | 202(11001010) | 210(11010010) | 219(11011011) |
| . | . | . | . |
| . | . | . | . |
| . | . | . | . |

As shown in table 1, in order to extend bit for gamma control, the first to third LUTs 154, 156, and 158 convert 6-bit digital data that are supplied via the multiplexer 150 to 8-bit digital data (MData) and supply the data to the data driver 120.

At this time, in each case where a deterioration degree is low, middle, or high for the same input signal, the 8-bit digital data (MData) of the first to third LUTs 154, 156, and 158 are supplied to the data driver 120. Small digital data (MData) are supplied where a deterioration degree is low and large digital data (MData) are supplied where a deterioration degree is high. At this time, small digital data have a short light emitting time in the light emitting cell (OLED) and large digital data have a long light emitting time in the light emitting cell (OLED). Therefore, by setting a light emitting time of the light emitting cell (OLED) to be short where a deterioration degree is low and setting a light emitting time of the light emitting cell (OLED) to be long where a deterioration degree is high, deterioration of the driving TFT (DT) or the light emitting cell (OLED) can be compensated.

Figure 7:
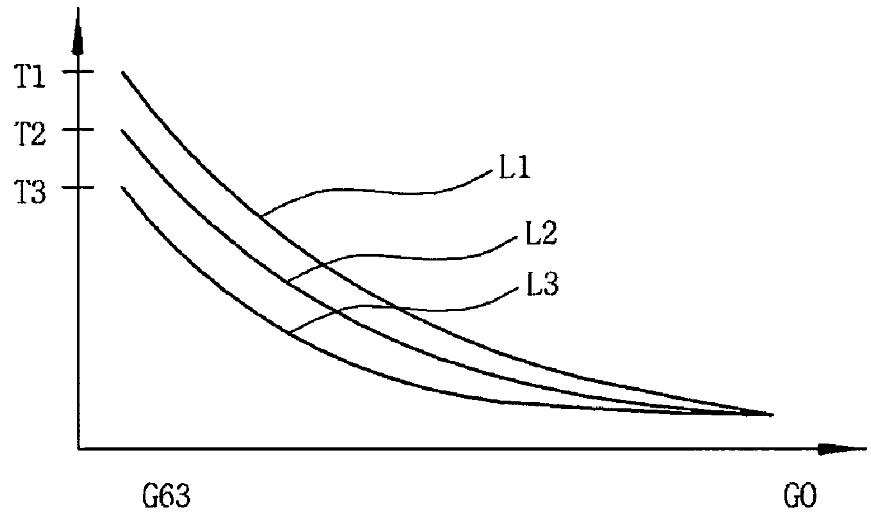
FIG. 7 is a diagram illustrating the relationship of a brightness value and a light emitting time of the light emitting display according to an embodiment of the present invention.

FIG. 7 is a diagram illustrating the relationship of a brightness value and a light emitting time of the light emitting display according to an embodiment of the present invention.

Referring to FIG. 7, 8-bit digital data (MData) of the first to third LUTs 154, 156, and 158 are determined so that the product of a deterioration degree or light emitting brightness and a light emitting time has a uniform value, i.e., uniform brightness. That is, brightness (L3) in a low deterioration degree is large than brightness (L1) in a high deterioration degree. Therefore, as in FIG. 7 and Equation 1, when a deterioration degree is low, a light emitting time is set to be short and when a deterioration degree is high, a light emitting time is set to be long, so that uniform brightness is obtained regardless of a deterioration degree.

$$L1\times T1=L2\times T2=L3\times T3 \qquad \text{Equation 1}$$

Figure 8:
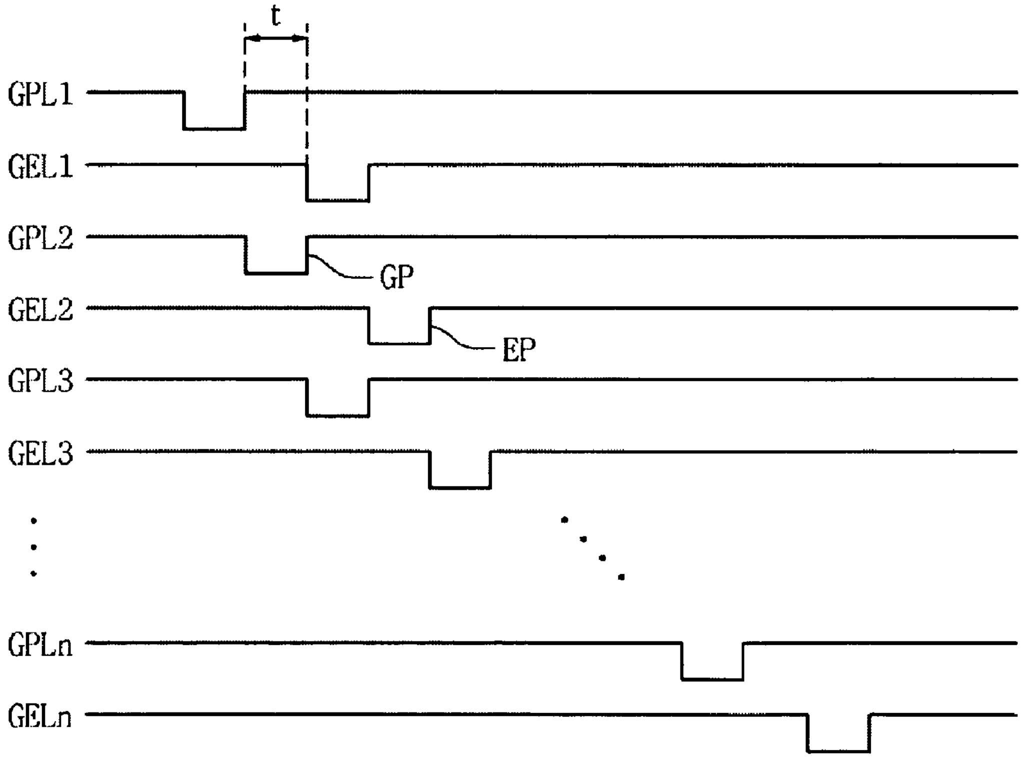
FIG. 8 is a waveform diagram illustrating a first scan signal and a second scan signal which are supplied to each of the first scan lines and the second scan lines shown in FIG. 4.

FIG. 8 is a waveform diagram illustrating a first scan signal and a second scan signal that are supplied to each of the first scan lines and the second scan lines shown in FIG. 4.

Referring to FIG. 8, the scan driver 118 generates a first scan signal (GP) and a second scan signal (EP) to correspond to a light emitting time (LT) of each of the sub-fields (SF1 to SF8) corresponding to each bit of the 8-bit digital data (MData) in response to a scan control signal from the timing controller 128, sequentially drives the first scan lines (GPL1 to GPLn) by supplying the first scan signal (GP) to the first scan lines (GPL1 to GPLn), and sequentially drives the second scan lines (GEL1 to GELn) by supplying the second scan signal (EP) to the second scan lines (GEL1 to GELn). At this time, the first scan signal (GP) and the second scan signal (EP) have the predetermined time difference (t) to correspond to a light emitting time (LT) of each of the sub-fields (SF1 to SF12).

The data driver 120 supplies a data voltage corresponding to the 8-bit of digital data (MData) supplied from the timing controller 128 to the data lines (DL1 to DLm) every horizontal period (1H) depending on a data control signal from the timing controller 128.

The light emitting display according to an embodiment of the present invention is driven in a time division driving method which drives by dividing each frame into a plurality of sub-fields (SF) corresponding to each bit of the 8-bit digital data (MData) in order to represent gray level of the 8-bit digital data (MData). At this time, the pixel circuit 116 divides one frame into 8 sub-fields (SF1 to SF8) to correspond to the 8-bit digital data (MData).

A first sub-field (SF1) among the 8 sub-fields (SF1 to SF8) corresponds to the lowest bit of the 8-bit digital data (MData) and an eighth sub-field (SF8) corresponds to the highest bit of the 8-bit digital data (MData).

Each of the 8 sub-fields (SF1 to SF8) is divided into light emitting times (LT1 to LT8) and non-light emitting times (UT1 to UT8). At this time, the light emitting times (LT1 to LT8) of each sub-field (SF1 to SF8) can use a binary code consisting of 1:2:4:8:16:32 . . . and a non-binary code consisting of 1:2:4:6:10:14:19 . . . for representing the 8-bit digital data signal with 256-level gray level.

During each period of the sub-fields (SF1 to SF8), the light emitting display emits light by sequentially scanning all pixels in a vertical direction, for example, from an upper direction to a lower direction of the light emitting display panel. Accordingly, light emitting times (LT1 to LT8) of each period of the sub-fields (SF1 to SF8) follow a slash mark within each of the sub-fields (SF1 to SF8). Desired gray level can be represented by combining all light emitting times (LT1 to LT8) within each of the sub-fields (SF1 to SF8) during one frame.

Specifically, the data driver 120 of the light emitting display according to an embodiment of the present invention supplies a data voltage of Table 1 corresponding to 8-bit digital data (MData) having 256-level gray level, which are converted by the first LUT 154 of the timing controller 128 to the data line (DL) of each of sub-fields (SF1 to SF8) when a deterioration degree of the pixel circuit 116 is relatively low.

Accordingly, each of the pixels is represented with 256-level gray level by combining light emitting times of each of the sub-fields (SF1 to SF8).

When a deterioration degree of the pixel circuit 116 is relatively high, the data driver 120 of the light emitting display according to an embodiment of the present invention supplies a data voltage of Table 1 corresponding to 8-bit digital data (MData) that are converted by the third LUT 158 of the timing controller 128 to the data line (DL) of each of sub-fields (SF1 to SF12). The second LUT 158 is the middle.

The light emitting display according to an embodiment of the present invention can represent an image depending on a deterioration degree of the pixel circuit 116 without adjusting the driving timing for driving the pixels 122 using the first to third LUTs 154, 156, and 158 corresponding to a deterioration degree.

An embodiment of the present invention has been described with reference to drawings, but the present invention is not limited to the embodiment.

In the embodiment, the deterioration degree is divided into three steps of high, middle, and low and compensates deterioration using the first to third LUTs 154, 156, and 158 depending on a deterioration degree, but the deterioration degree may be divided into two steps or four steps or more. The LUT may be comprised in proportional to the number of steps of the deterioration degree. Digital data of the LUT have the uniform product of brightness and a light emitting time and thus are determined so that the light emitting cell has uniform brightness regardless of a deterioration degree.

In the embodiment, time division driving is performed by dividing one frame into 8 sub-fields, but the number of sub-fields may be changed depending on data or light emitting ability of the light emitting cell, and driving ability of the scan driver. For example, one frame can be divided into 12 sub-fields.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light emitting display comprising:

a pixel circuit that comprises pixels that emit light by a current;

a scan driver that supplies a first scan signal, which is a write signal that selects the data signal, and a second scan signal, which is an erasing signal to the pixels;

a deterioration sensor that detects a deterioration degree of the pixel circuit and generates bright signals depending to the deterioration degree;

a timing controller including a selection signal generator that generates a plurality of selection signals depending on the bright signals from the deterioration sensor, a selector that selectively supplies N-bit digital data depending on each of the plurality of selection signals, and a plurality of data converters that converts the N-bit digital data selectively supplied from the selector into M-bit digital data and outputs the M-bit digital data, wherein N is a positive integer and M is a positive integer larger than N; and a data driver that supplies the M-bit data from the plurality of data converter to the pixels, wherein the timing controller divides one frame into a plurality of sub-fields corresponding to each bit of the M-bit data in order to represent gray level of the M-bit data, wherein each of the sub-fields is divided into light emitting times and non-light emitting times, wherein the light emitting times of each sub-field use at least one of a binary code consisting of 1:2:4:8:16:32 . . . and a non-binary code consisting of 1:2:4:6:10:14:19 . . . for representing k-bit digital data signal, wherein a supply voltage source that supplies a power voltage to the pixels including R pixels, G pixels and B pixels is one, wherein the selection signal generator supplies a selection signal of a first logic state to the selector when the brightness signal that is supplied from the deterioration sensor is within a first range, supplies a selection signal of a second logic state to the selector when the brightness signal is within a second range, and supplies a selection signal of a third logic state to the selector when the brightness signal is within a third range, wherein the selection signal generator generates the selection signal of the first logic state when the deterioration degree of the pixel circuit is relatively small, generates the selection signal of the second logic state when the deterioration degree of the pixel circuit is relatively middle, and generates the selection signal of the third logic state when the deterioration degree of the pixel circuit is relatively large, wherein the M-bit data are determined so that products of brightness values of the pixels of the pixel circuit and the light emitting times are uniform, wherein the M-bit data are determined so that the light emitting times are set to be short when the deterioration degree of the pixels is low and the brightness values of the pixels are high, and wherein the M-bit data are determined so that the light emitting times are set to be long when the deterioration degrees of the pixels is high and the brightness values of the pixels are low.

2. The light emitting display of claim 1, wherein the N bit is 6 bit and the M bit is 8 bit.

3. The light emitting display of claim 1, wherein each of the pixels comprises:

a data line to which the data signal is supplied;

a first scan line to which the first scan signal is supplied;

a second scan line to which the second scan signal is supplied;

a light emitting cell connected between a supply voltage source and a ground voltage source;

a driving switch connected between the supply voltage source and the light emitting cell;

a first switching switch connected between the data line and a gate of the driving switch, and in which the gate is connected to the first scan line;

a second switching switch connected between the gate of the driving switch and the supply voltage source, and in which the gate is connected to the second scan line; and a storage capacitor disposed between the supply voltage source and the gate of the driving switch.

4. The light emitting display of claim 3, wherein the switch is a P-type electron metal-oxide semiconductor field effect transistor (MOSFET) or a P-type MOS transistor.

5. The light emitting display of claim 3, wherein the light emitting cell is an organic electric field light emitting element that comprises an organic light emitting layer.

6. A method of driving a light emitting display comprising:

providing a pixel circuit that comprises pixels that emit light by a current;

supplying, with a scan driver, a first scan signal that is a write signal that selects the data signal, and supplying, with the scan driver, a second scan signal that is an erasing signal to the pixels;

supplying a power voltage to the pixels including R pixels, G pixels and B pixels from one supply voltage source;

a deterioration sensor that detects a deterioration degree of the pixel circuit and generates bright signals depending to the deterioration degree detecting, with a deterioration sensor, a deterioration degree of the pixel circuit and generating, with the selection signal generator, bright signals depending to the deterioration degree;

generating, with a selector, a plurality of selection signals depending on the bright signals;

selectively supplying N-bit digital data depending on each of the plurality of selection signals;

converting the N-bit digital data into M-bit digital data and outputting the M-bit digital data, wherein N is a positive integer and M is a positive integer larger than N; and supplying the M-bit data to the pixels, wherein one frame is divided into a plurality of sub-fields corresponding to each bit of the M-bit data in order to represent gray level of the M-bit data, wherein each of the sub-fields is divided into light emitting times and non-light emitting times, wherein the light emitting times of each sub-field use at least one of a binary code consisting of 1:2:4:8:16:32 . . . and a non-binary code consisting of 1:2:4:6:10:14:19 . . . for representing k-bit digital data signal, wherein the selection signal generator supplies a selection signal of a first logic state to the selector when the brightness signal that is supplied from the deterioration sensor is within a first range, supplies a selection signal of a second logic state to the selector when the brightness signal that is supplied from the deterioration sensor is within a second range, and supplies a selection signal of a third logic state to the selector when the brightness signal that is supplied from the deterioration sensor is within a third range, wherein the selection signal generator generates the selection signal of the first logic state when the deterioration degree of the pixel circuit is relatively small, generates the selection signal of the second logic state when the deterioration degree of the pixel circuit is relatively middle, and generates the selection signal of the third logic state when the deterioration degree of the pixel circuit is relatively large, wherein the M-bit data are determined so that products of brightness values of the pixels of the pixel circuit and the light emitting times are uniform, wherein the M-bit data are determined so that the light emitting times are set to be short when the deterioration deqree of the pixels is low and the brightness values of the pixels are high, and wherein the M-bit data are determined so that the light emitting times are set to be long when the deterioration degree of the pixels is high and the brightness values of the pixels are low.

7. The method of driving a light emitting display of claim 6, wherein the pixels of the pixel circuit are formed in a non-light emitting area.

8. The method of driving a light emitting display of claim 6, wherein the N bit is 6 bit and the M bit is 8 bit.

9. The method of driving a light emitting display of claim 6, wherein each of the pixels comprises:

a data line to which the data signal is supplied;

a first scan line to which the first scan signal is supplied;

a second scan line to which the second scan signal is supplied;

a light emitting cell connected between a supply voltage source and a ground voltage source;

a driving switch connected between the supply voltage source and the light emitting cell;

a first switching switch connected between the data line and a gate of the driving switch, and in which the gate is connected to the first scan line;

a second switching switch connected between the gate of the driving switch and the supply voltage source, and in which the gate is connected to the second scan line; and a storage capacitor disposed between the supply voltage source and the gate of the driving switch.

10. The method of driving a light emitting display of claim 9, wherein the switch is a P-type electron metal-oxide semiconductor field effect transistor (MOSFET) or a P-type MOS transistor.

11. The method of driving a light emitting display of claim 9, wherein the light emitting cell is an organic electric field light emitting element that comprises an organic light emitting layer.

* * * * *

UNITED STATES PATENT AND TRADEMARK OFFICE

CERTIFICATE OF CORRECTION

PATENT NO. : 8,018,449 B2
APPLICATION NO. : 11/454597
DATED : September 13, 2011
INVENTOR(S) : Chang Hoon Jeon It is certified that error appears in the above-identified patent and that said Letters Patent is hereby corrected as shown below:

In column 10, claim 6, line 9, before “of the pixels is low” replace “deqree” with --degree--.

Signed and Sealed this
Twenty-seventh Day of December, 2011

David J. Kappos
*Director of the United States Patent and Trademark Office*